(12) United States Patent
Balestrieri

(10) Patent No.: US 9,478,004 B2
(45) Date of Patent: Oct. 25, 2016

(54) METHOD AND SYSTEM FOR ANALOG/DIGITAL IMAGE SIMPLIFICATION AND STYLIZATION

(71) Applicant: John Balestrieri, Brooklyn, NY (US)

(72) Inventor: John Balestrieri, Brooklyn, NY (US)

( * ) Notice: Subject to any disclaimer, the term of this patent is extended or adjusted under 35 U.S.C. 154(b) by 259 days.

(21) Appl. No.: 14/250,475

(22) Filed: Apr. 11, 2014

(65) Prior Publication Data

US 2014/0307978 A1    Oct. 16, 2014

Related U.S. Application Data

(60) Provisional application No. 61/810,775, filed on Apr. 11, 2013.

(51) Int. Cl.
| | | |
|---|---|---|
| *G06T 5/50* | (2006.01) | |
| *G06T 3/00* | (2006.01) | |
| *G06T 11/00* | (2006.01) | |
| *G06T 5/00* | (2006.01) | |
| *G06T 5/10* | (2006.01) | |

(52) U.S. Cl.
CPC ............... *G06T 3/00* (2013.01); *G06T 5/001* (2013.01); *G06T 5/10* (2013.01); *G06T 11/001* (2013.01)

(58) Field of Classification Search
None
See application file for complete search history.

(56) References Cited

U.S. PATENT DOCUMENTS

| | | | |
|---|---|---|---|
| 2,691,696 A | 10/1954 | Yule | |
| 4,794,531 A | 12/1988 | Morishita et al. | |
| 5,253,064 A * | 10/1993 | Yamamoto | G06T 3/4007 |
| | | | 348/240.2 |
| 5,282,152 A | 1/1994 | Caviasca et al. | |
| 5,374,995 A * | 12/1994 | Loveridge | G06T 3/4023 |
| | | | 348/240.99 |
| 6,101,272 A | 8/2000 | Noguchi | |
| 6,389,169 B1 | 5/2002 | Stark et al. | |
| 6,574,004 B1 | 6/2003 | Jacob et al. | |
| 6,763,515 B1 | 7/2004 | Vazquez et al. | |
| 6,774,909 B1 | 8/2004 | Nishio | |
| 6,778,186 B2 | 8/2004 | Mehigan | |
| 7,302,112 B2 * | 11/2007 | Shimazaki | H04N 5/208 |
| | | | 348/625 |
| 7,750,945 B2 * | 7/2010 | Serizawa | H04N 5/208 |
| | | | 348/221.1 |

(Continued)

OTHER PUBLICATIONS

Paul L. Rosin Yu-Kun Lai "Towards artistic minimal rendering" Proceeding NPAR '10 Proceedings of the 8th International Symposium on Non-Photorealistic Animation and Rendering pp. 119-127 ACM New York, NY 2010.*

(Continued)

*Primary Examiner* — Sean Motsinger
(74) *Attorney, Agent, or Firm* — Thomas A. O'Rourke; Bodner + O'Rourke, LLP

(57) ABSTRACT

A computer program product includes instructions for a processor to perform a method of improving image structure and coherence, and/or for simplification/stylization. The method includes inputting the image, by: scanning the image; image capture using a camera; and/or image creation using a computer. Multi-channel images are converted into a single-channel grayscale image, which is separated into a first image component—the high spatial frequencies, and a second component image—the low spatial frequencies. The first and second component images are each formed by filtering to remove frequencies outside of respective upper and lower threshold frequencies. A gain multiplier is applied to the filtered first and second component images to control detail amplification. The first and second component images are each blurred at the respective upper and lower threshold frequencies. An improved stylized composite image results by subtracting the gain multiplied first component image from the gain multiplied second component image.

16 Claims, 17 Drawing Sheets

(56) References Cited

U.S. PATENT DOCUMENTS

| | | | |
|---|---|---|---|
| 7,787,653 B2 | 8/2010 | Rhoads | |
| 7,945,075 B2 | 5/2011 | Lu et al. | |
| 8,270,498 B2 | 9/2012 | Filippini et al. | |
| 8,335,379 B2 | 12/2012 | Malik | |
| 8,629,883 B2 | 1/2014 | Birdal et al. | |
| 2004/0212725 A1* | 10/2004 | Raskar | G06T 15/02 348/370 |
| 2008/0284791 A1* | 11/2008 | Bressan | G06K 9/4638 345/589 |
| 2010/0111439 A1 | 5/2010 | Fu | |
| 2011/0175912 A1* | 7/2011 | Beeler | G06T 7/0075 345/423 |
| 2011/0229029 A1* | 9/2011 | Kass | G06T 5/002 382/168 |
| 2012/0313937 A1* | 12/2012 | Beeler | G06T 19/00 345/419 |
| 2013/0121546 A1 | 5/2013 | Guissin | |
| 2014/0307978 A1* | 10/2014 | Balestrieri | G06T 3/00 382/263 |
| 2014/0328509 A1* | 11/2014 | Guissin | G06T 5/002 382/100 |

OTHER PUBLICATIONS

Derpanis, Konstantinos G., Outline of the Relationship between the Difference-of-Gaussian and Laplacian-of-Gaussian, NYU Dept. of CS & Eng., Sep. 19, 2006, p. 1-3.

Criminisi, A., et al., Region Filling & Object Removal by Exemplar-Based Image Inpainting, IEEE Transactions on Image Processing, vol. 13, No. 9, Sep. 2004.

Secret, Ben, Ben Secret Explains How to Achieve Smooth Yet Sharp Images, Without Losing Realism, http://www.computerarts.co.uk/tutorials/retouch-images-frequency-separation.

Hirshon, Bob, Mona Lisa's Smile, http://sciencenetlinks,com/science-news/science-updates/mosa-lisas-smile/ Nov. 2, 2012.

Goffaux & Rossion, Faces are "Spatial"—Holistic Face Perception is Supported by Low Spatial Frequencies, Journal of Experimental Psychology, 2006, V.32, No. 4, 1023-1039.

\* cited by examiner

Example: Input

Example: Detail Bandpass Map

Example: Structure Bandpass Map

Example: Structure Bandpass Map

Example: Input

Example: Detail Band Pass Map

Example: Structure Bandpass Map

Example: Composite Output

METHOD AND SYSTEM FOR ANALOG/DIGITAL IMAGE SIMPLIFICATION AND STYLIZATION

CROSS REFERENCE TO RELATED APPLICATIONS

This application claims priority on U.S. Provisional Application Ser. No. 61/810,775 filed on Apr. 11, 2013, the disclosures of which are incorporated herein by reference.

FIELD OF THE INVENTION

The present invention relates to improvements in analog/digital image processing, and more particularly to a method of manipulating image spatial frequencies to improve image structure and coherence of digital images.

BACKGROUND OF THE INVENTION

Images may be created by artists and technicians, using various techniques, from an actual physical scene, from an imaginary one that is originated within the mind of its creator, or from a scene generated by a computer. Still photographs of a real scene may be captured in a particular fashion, including filtering, to achieve the artist's expression and evoke some emotional response in the viewer. The creation of an image by hand may include very basic methods of manipulating perception, such as the creation of the illusion of a three dimensional perspective view on a flat sheet, which may be accomplished using a one-point perspective, or a two-point perspective, etc. The creation of an image by computer may be created by means such as the three dimensional rendering of mathematic scene description, e.g., a rendering of a fractal landscape or interactive virtual game world. The ability of an artist to use a computer to manipulate an image that has been captured digitally to manipulate the viewer's perception, may be just as powerful, even more powerful.

It is now known that a key basis for more complex manipulation of the way a viewer perceives an image is through the particular use of spatial frequencies therein. In physics and mathematics, a spatial frequency is the measure of how often a cyclic component is repeated per unit of distance. In wave mechanics, the spatial frequency (ν) is related to the wavelength (λ) by the formula, $(\nu)(\lambda)=1$ (or, $\nu=1/\lambda$). In discussions of the human visual system, "Spatial frequency" refers to the number of pairs of bars imaged for a given distance on the retina, and may be expressed as the number of cycles per degree of visual angle. One-third of a millimeter is a convenient unit of retinal distance because this image size may subtend one degree of visual angle on the retina. The use of different spatial frequencies conveys different information to a viewer about various aspects of an image. High spatial frequencies represent abrupt spatial changes, such as edges formed within the image, corresponding to information regarding particular features and fine detail, whereas low spatial frequencies represent global information relating to overall shape, particularly its general orientation and proportions.

Visual information at different spatial frequencies or ranges of spatial frequencies may be utilized by an artist, and may be layered one upon the other, to convey different impressions and features, which is because different parts of the human eye are more perceptive to certain spatial frequencies. With an image being composed of layers of both high and low spatial frequency patterns, what is perceived by a viewer will depend upon how the viewer looks at the image. The anatomical basis for this phenomenon is the adaptation of a person's central vision to seeing the finer details described by high spatial frequencies, but not the broad, blurry patterns described by low spatial frequencies, whereas a person's peripheral vision is the opposite, and is adapted to better seeing the low spatial frequencies, which must be visualized outside of your central line of vision.

These anatomical characteristics of the human visual system explain the mystery behind the smile of Leonardo Da Vinci's subject in the painting, "Mona Lisa." The portion of her smile that appears happy (corners of the lips drawn upwards) is found within low spatial frequencies, and may thus be properly seen through a person's peripheral vision—when not looking directly at her lips and mouth. When attempting to look directly at Mona Lisa's smile, portions of the smile blend into the background, diminishing the appearance of a smile, leaving the viewer to question whether or not she is truly smiling. The same phenomenon may be experienced with other well known works of art, such as those of the impressionist painters, where a close and direct examination of those works makes it more difficult to recognize detail because the prolific low spatial frequencies of the work are essentially being viewed using a high-frequency filter, which conversely improves when viewing the work off-center and from farther away using peripheral vision—a low-frequency filter.

Therefore, the methods of the present invention are directed to manipulating both the high and low spatial frequencies of an image, to achieve certain desired simplification to, and stylization of, that image.

OBJECTS OF THE INVENTION

It is an object of the invention to provide a method of manipulating the high and low spatial frequencies of a digital image to achieve desired simplification and stylization of the image.

It is another object of the invention to provide a means of separating high and low spatial frequencies of an inputted image through filtering techniques.

It is a further object of the invention to provide a means of filtering particular bands of selective high and low spatial frequencies.

It is another object of the invention to provide a means of providing noise reduction to accomplish the removal of non-meaningful visual information.

It is also an object of the invention, in one embodiment, to provide a composite digital output of the separate, modified spatial frequency ranges, through a subtraction operation.

Further objects and advantages of the invention will become apparent from the following description and claims, and from the accompanying drawings.

SUMMARY OF THE INVENTION

The present invention is directed to a process for manipulating the high spatial frequencies and the low spatial frequencies of an image to achieve particular digital effects upon the image, including desired simplification and stylization of the image. The core steps of the method may include taking a two-dimensional source image through an input step, a frequency separation step, respective band-pass mapping steps performed on the separated frequencies, an optional noise reduction step, and a composite output step.

Additional composite steps may be performed, such as a final composite step where the image is composited with color information.

During the frequency separation step, the input image is split into two copies—into a first copy containing the high spatial frequencies, and a second copy containing the low spatial frequencies. The copy containing the high spatial frequencies may be filtered in the Detail Band-pass Map to eliminate frequencies above an upper bound frequency, and to also eliminate frequencies below a lower bound frequency. The band of spatial frequencies between the two selected bounds may be subjected to a gain multiplier to control detail amplification, and may furthermore be offset to control light and shadow bias. A blur technique may be used at the lower frequency bound and at the upper frequency bound, such as a Gaussian blur, a Box blur, a blur filter, or other methods of achieving the same end, which may be done optically or may be done digitally using an algorithm. An optional noise reduction step may be performed for the removal of random image artifacts (noise), resulting from image capture for images derived from film or digital cameras.

The copy containing the low spatial frequencies may be subjected to a comparable Structure Band-pass Map, with respective upper and lower frequency bounds and an optional gain multiplier and offset. Noise reduction need not be performed on the Structure Band-pass Map because the lower bound frequency used is large enough that it functions as a noise reduction filter. The output from the Detail Band-pass Map and the Structure Band-pass Map may be composited together to produce the final image, by subtracting the Detail Band-pass Map from the Structure Band-pass Map, with an offset parameter being used to keep the final value range positive. Optional post-processing steps may be performed for noise reduction and image simplification.

The composited image creates a stylized image that resembles an artistic rendering, by emulating the artistic process of distinguishing between low and high spatial frequencies, such as is achieved for comic book illustration, for ancient Greek black figure or red figure pottery, and for woodblock engraving illustration, where high frequency white lines are placed against low frequency areas of black, and high frequency black lines are placed against low frequency areas of white. Separation and manipulation of frequencies can result in better image structure, more visual coherence, a more readable image, and/or it can be used to achieve an artistic goal.

DETAILED DESCRIPTION OF THE INVENTION

For centuries—whether intentionally or intuitively—artists and illustrators have been processing visual information in a way that first creates a distinction between high and low spatial frequencies and then creates images that merge or synthesize these distinctions into a stylized representation of reality. This distinction between high and low spatial frequencies may be an artistic abstraction or simplification of the biological and/or neurological processes behind human vision. For example, only a small area of the retina, the fovea, is capable of resolving high spatial frequencies. The rest of the retina sees only low spatial frequencies. Separation and manipulation of frequencies can result in better image structure, more visual coherence, a more readable image, and/or it can be used to achieve an artistic goal.

Figure 1:
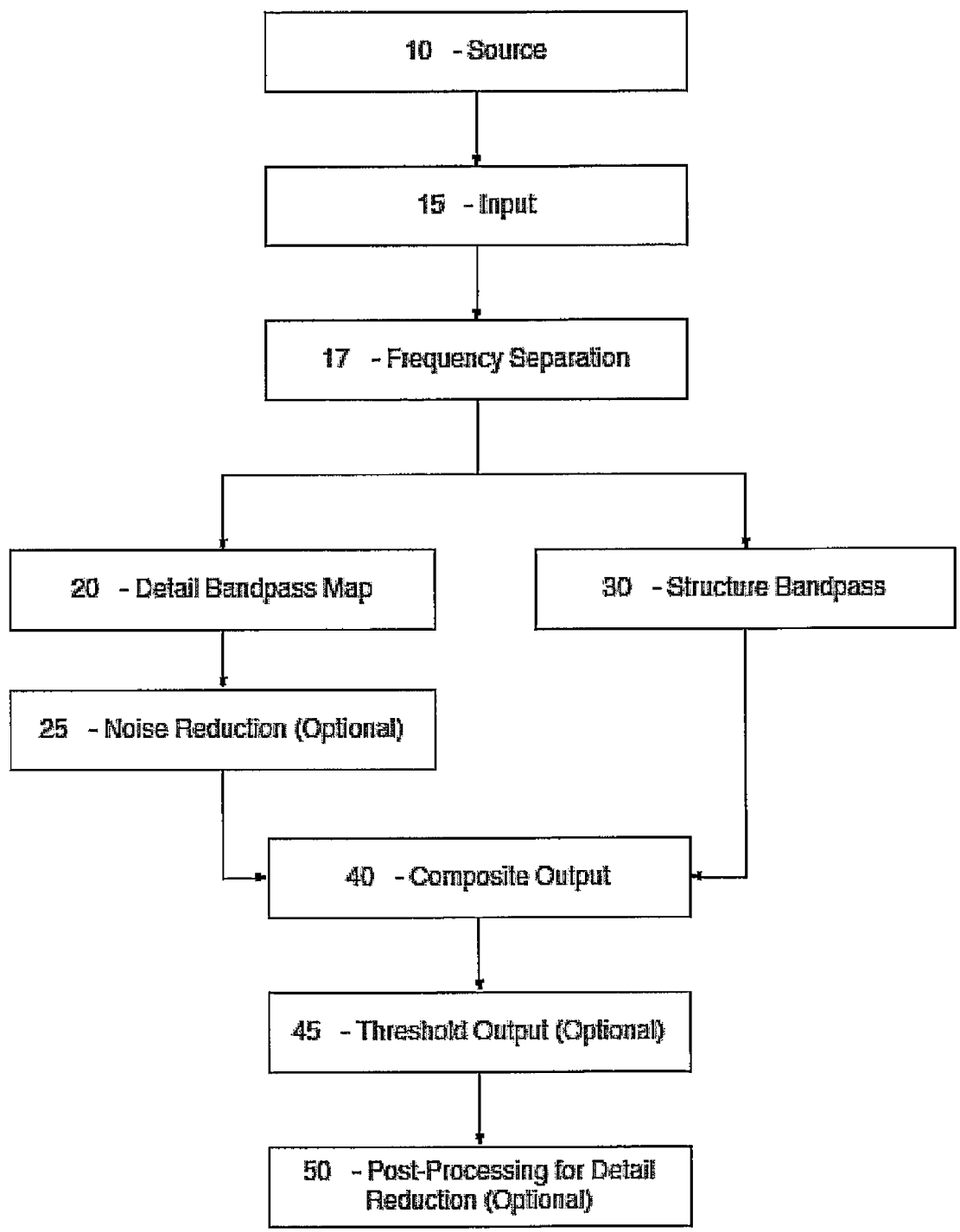
FIG. 1 is a block diagram illustrating steps for performing the method of the present invention.
Figure 1A:
FIG. 1A is an image of the highly studied portrait "Mona Lisa," painted by the Italian artist Leonardo Da Vinci.
Figure 1B:
FIG. 1B is the face of the Mona Lisa image of FIG. 1A, but filtered to show the low spatial frequencies.
Figure 1C:
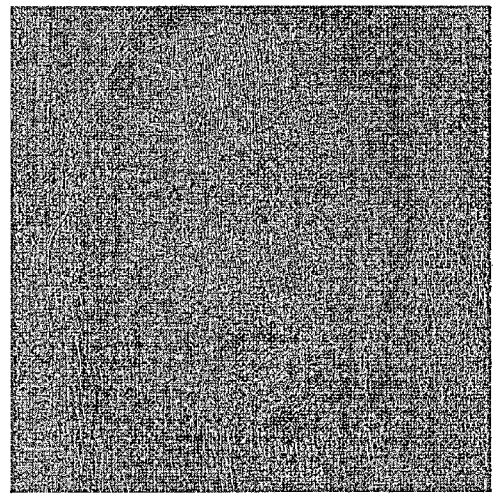
FIG. 1C is the face of the Mona Lisa image of FIG. 1A, but filtered to show the high spatial frequencies.
Figure 1D:
FIG. 1D shows an example of a digital image input into the process of the present invention
Figure 1E:
FIG. 1E is the digital image of FIG. 1D after undergoing the detail band-pass mapping of the present invention.
Figure 1F:
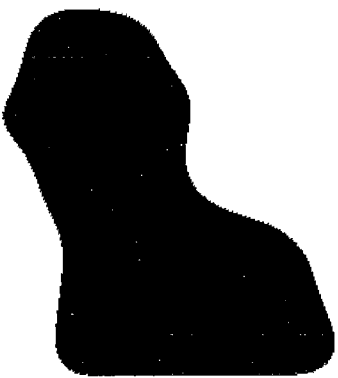
FIG. 1F is the digital image of FIG. 1D after undergoing the structure band-pass mapping of the present invention.
Figure 1G:
FIG. 1G is the resultant digital image of FIG. 1E and FIG. 1F after undergoing the composite output method of the present invention.

An example of these effects can be seen through an analysis of Leonardo da Vinci's painting, "Mona Lisa," which is shown in FIG. 1A. FIGS. 1B, and 1C, show the image of Mona Lisa from FIG. 1A, but filtered to only show the low spatial frequencies in FIG. 1B, and the high spatial frequencies in FIG. 1C. As described above, the portion of her smile that appears happy (corners of the lips drawn upwards) is found within the low spatial frequencies illustrated in FIG. 1B, which may be properly seen through a person's peripheral vision when looking at the composite image. The pursed, non-smiling lips found within the high spatial frequencies in the Mona Lisa image of FIG. 1C illustrate what will be visualized when attempting to look directly at Mona Lisa's smile in the composite image.

Another example of the specific use of high and low spatial frequencies is known by comic book illustrators as an effect called the "massing of blacks" (see e.g., "The Art Of Comic Book Inking," by Gary Martin, rewrite by Anina Bennett, p. 9, the disclosures of which are incorporated herein by reference). Similarly, in the book "How to Draw Comics the Marvel Way," by Stan Lee and John Buscema (the disclosures of which are incorporated herein by reference), the authors use black and white images to explain to the reader how the "massing of blacks" effects the viewer's perceptions. On page 152 of the Marvel book (1984 edition), the authors show a panel image beside the comic book image, where the panel image takes the comic image and reduces it to its simplest form, to illustrate the "crisp contrast between the stark black and white values." So the massing of blacks functions to clarify images and serves certain artistic aims, particularly by helping to "focus important elements in a picture by attracting the eye toward any desired area" and to "create dramatic moods . . . " Therefore, the high and low frequencies of any image may be selectively manipulated to achieve a variety of aesthetic outcomes.

FIG. 1 contains a block diagram illustrating certain method steps of the present invention that may be performed to achieve particular digital effects to an inputted image. The core steps of the method may include taking a two-dimensional source image 10 through an input step 15, a frequency separation step 17, respective band-pass mapping steps 20 and 30 performed on the separated frequencies, an optional noise reduction step 25, and a composite output step 40. Additional composite steps may be performed, such as a final composite step where the image is composited with color information.

Figure 2A:
FIG. 2A is another example of a digital image input into the process of the present invention.

The source 10 may be a two-dimensional image map, the internal computer representation of an image. FIG. 2A shows an example input image. The source image 10 may therefore be a digital image in the form of a rectangular array of pixels. Each of those pixels may contain several numbers that represent the intensity (brightness) and the color of the image at the pixel's location. For a grayscale digital image that uses a single color (black), each pixel location may contain a single number. Color images that use multiple channels (e.g., the RGB image that uses Red, Green, and Blue channels) contain numbers for each channel for every pixel location.

The source image 10 may initially be inputted using any of the following options:

A) Scanned using a conventional scanner, either from a photograph or artistic rendering (drawing, painting, collage, etc.);

B) Captured using a digital video camera, still image camera, or mobile phone;

C) Created on a computer or tablet by an artist who draws or paints an image in shades of gray;

D) Produced by 3-dimensional design software (e.g., commercial computer aided design and rendering software packages such as "Modo" or "Cinema 4D"); or E) Produced by real-time 3-dimensional rendering such as used in games or game consoles (Xbox, etc.).

Note—to be informative to one of skill in the art, pseudo code is excerpted and illustrated at appropriate sections throughout the specification. The pseudo code to load a source image 10 is as follows:

```
pixel_width as Integer = 100; // Example value
pixel_height as Integer = 100; // Example value
color_image as Picture;
color_image = AquireColorSourceImage(pixel_width, pixel_height);
```

The method of the current invention works on single channel images. Therefore, if a source image 10 contains multiple channels, a single channel can be used and the others may be discarded. Alternatively, the channels may be merged to produce a single-channel grayscale image, by using a weighting scheme. Several U.S. patents disclose a suitable conversion process, such as: U.S. Pat. No. 5,282,152 to Caviasca; U.S. Pat. No. 6,101,272 to Noguchi; U.S. Pat. No. 6,574,004 to Jacob; U.S. Pat. No. 6,774,909 to Nishio; U.S. Pat. No. 6,778,186 to Mehigan; and U.S. Pat. No. 7,945,075 to Lu, the disclosures of which are incorporated herein by reference. Alternatively, the multiple channels may be split (i.e., separation of the R, G, and B channels) or transformed (e.g., transformation of RGB to HSV, or RGB to HSL) into a series of single-component channels, and may be processed separately, and may later be recombined (reverse transformed).

```
single_channel_image as Picture;
single_channel_image = ConvertColorToGrayPicture(color_image);
```

The input image 15 is split into two copies at the frequency separation step 17 into a first copy containing the high spatial frequencies, and a second copy containing the low spatial frequencies, using proprietary software, and/or using commercial software, such as Adobe® Photoshop®.

(Alternatively, the separation step can be performed as part of performing the bandpass filtering steps discussed hereinafter).

The copy containing the high spatial frequencies may be filtered, using proprietary software and/or commercial software, in the Detail Band-pass Map 20, and may be controlled according to two required parameters and two other optional parameters, as follows:

Upper Bound Frequency (required): Frequencies above this ceiling are dropped.

Lower Bound Frequency (required): Frequencies below this floor are dropped.

Gain (optional): This multiplies the final frequency range and controls "detail amplification."

Offset (optional): This adds to/subtracts from the final frequency range and controls "light and shadow bias."

The resulting Detail Band-pass Map contains the spatial frequencies between the lower bound frequency and the upper bound frequency. The implementation presented here performs this calculation in image space, where the parameters are expressed as a radii parameter to a blur convolution, as follows:

```
lower_high_frequency_blur_radius as Real = 1; // Example value
upper_high_frequency_blur_radius as Real = 2; // Example value
```

To create the Detail Band-pass Map, two low-pass maps are created by blurring copies of the input, one at the lower frequency bound and one at the higher frequency bound. Blurring may be accomplished using a Gaussian function (a bell curve), with the function being in the form:

$$f(x) = ae^{-\frac{(x-b)^2}{2c^2}}$$

for some real constants a, b, c, where a is the height of the curve's peak, b is the position of the center of the peak, and c controls the width of the "bell," and where e is Euler's irrational and transcendental constant, 2.71828 . . . . Blurring may also be accomplished using a Box blur, with Full or Partial sampling (Equal Interval, Pseudorandom or Stochastic sampling). For each pixel, a Box blur takes a surrounding window of pixels, adds each pixel value equally, scales the total value to be within the pixel value range, then sets the original pixel to the scaled value. Alternatively, other filters can be used which weight pixels unequally. A Box blur and a Gaussian blur both require the integration of a lot of pixels. For instance, if the pixel window is 100×100, then 10000 pixels must be read. An approximation may be used whereby instead of sampling every pixel, only a fraction of the pixels are sampled, which become representative of the whole area. The locations of the sampled pixels could be fixed (uses an equal interval, i.e., "sum every 4 pixels,") or could be stochastic (determined randomly).

The blur may also be accomplished through other methods, such as incremental computation (e.g., an image is repeatedly filtered with a small blur window until the result approximates a large blur window), and/or by using a two step process of first reducing the image and using integration to merge many pixels into few pixels, and then enlarging the image by interpolating from the few pixels back to many pixels, and so the blurring method may be digital (i.e., performed by an algorithm on a computer), or may be continuous (i.e., performed optically and then captured digitally):

```
lower_high_frequency_detail as Picture;
lower_high_frequency_detail = Smooth(single_channel_image,
    lower_high_frequency_blur_radius);
upper_high_frequency_detail as Picture;
upper_high_frequency_detail = Smooth(single_channel_image,
    upper_high_frequency_blur_radius);
```

With the blur being performed optically, a camera may take an in focus picture, which is used as input at step 10, then the camera lens defocuses the same scene/image by several different amounts and each blurred representation is used as an input to the Detail and Structure band pass steps. A further discussion of photographic unsharp masking may be found in U.S. Pat. No. 2,691,696 to Yule for "Electrooptical Unsharp Masking in Color Reproduction," and U.S. Pat. No. 4,794,531 to Morishita for "Unsharp Masking for Image Enhancement," with the disclosures of each being incorporated herein by reference. Although a Gaussian blur produces good results, some of the other techniques are better when fast computation is required.

Figure 2B:
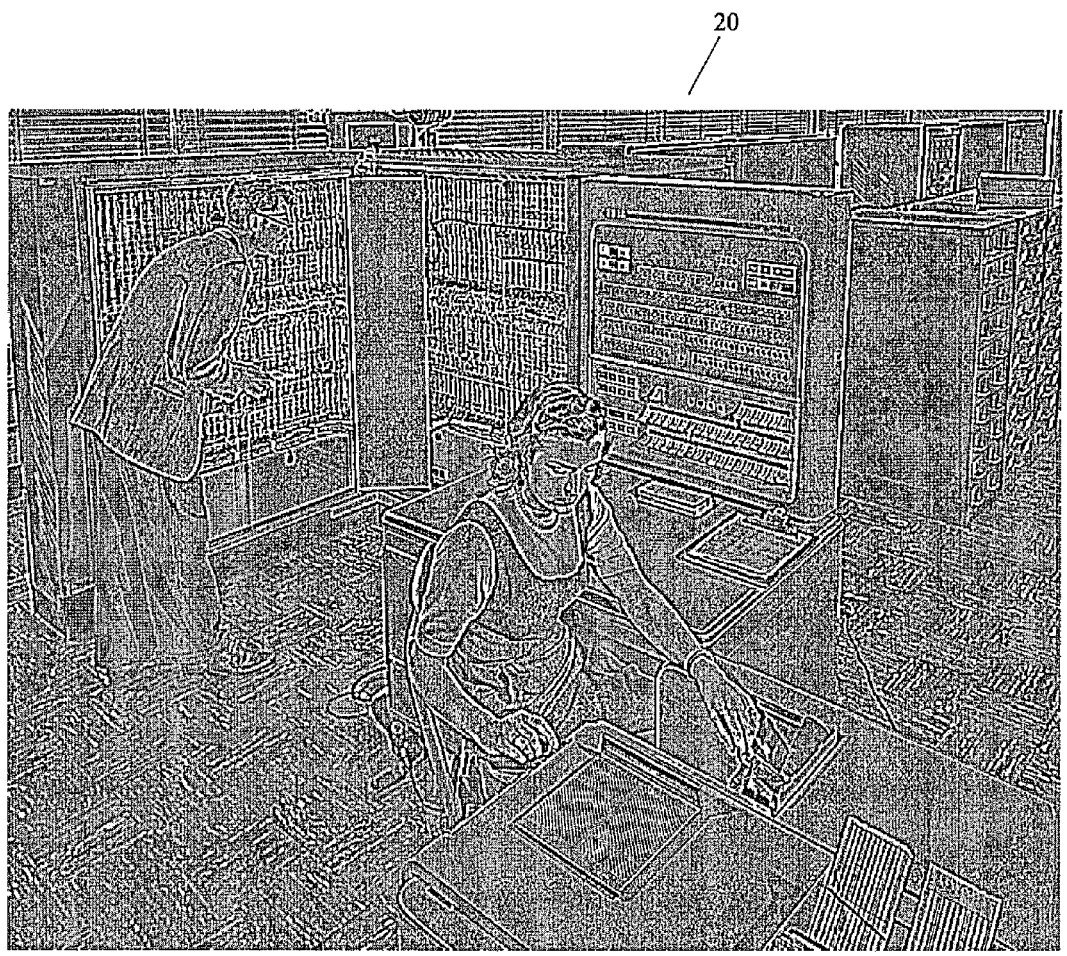
FIG. 2B is the digital image of FIG. 2A after undergoing the detail band-pass mapping of the present invention.
Figure 2C:
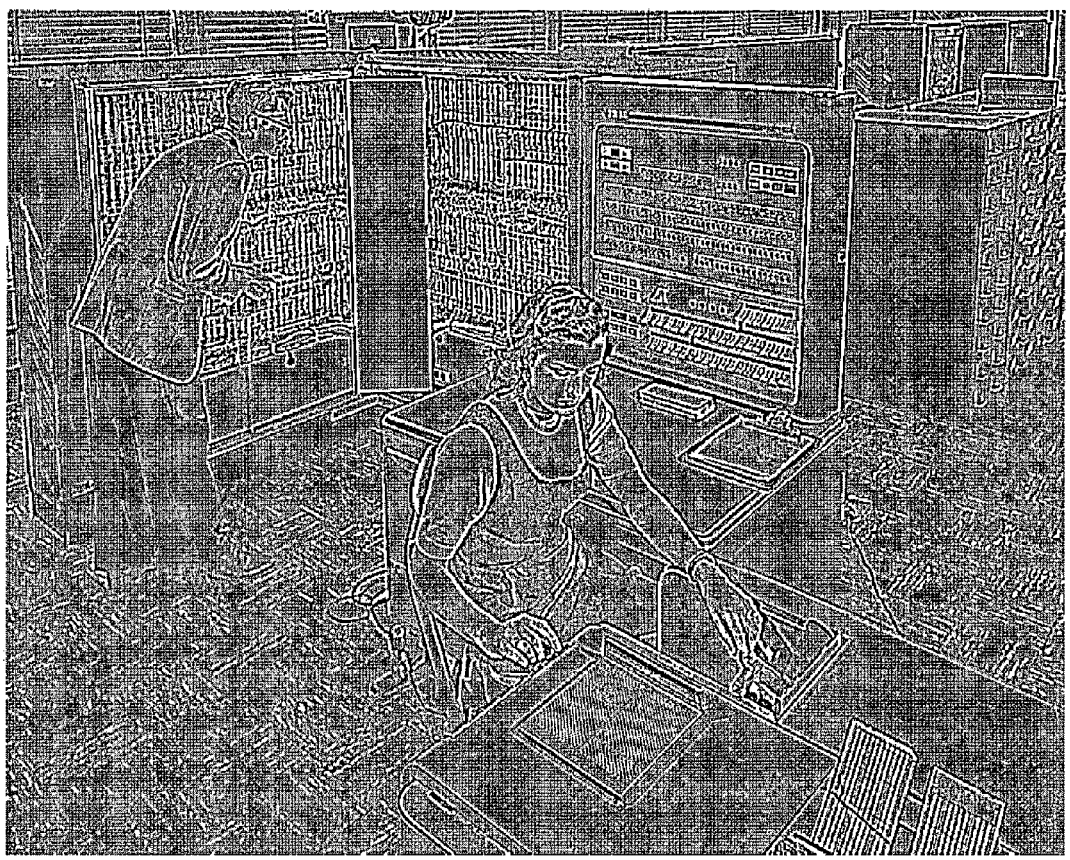
FIG. 2C is the digital image of FIG. 2B after undergoing optional noise reduction of the present invention.
Figure 2D:
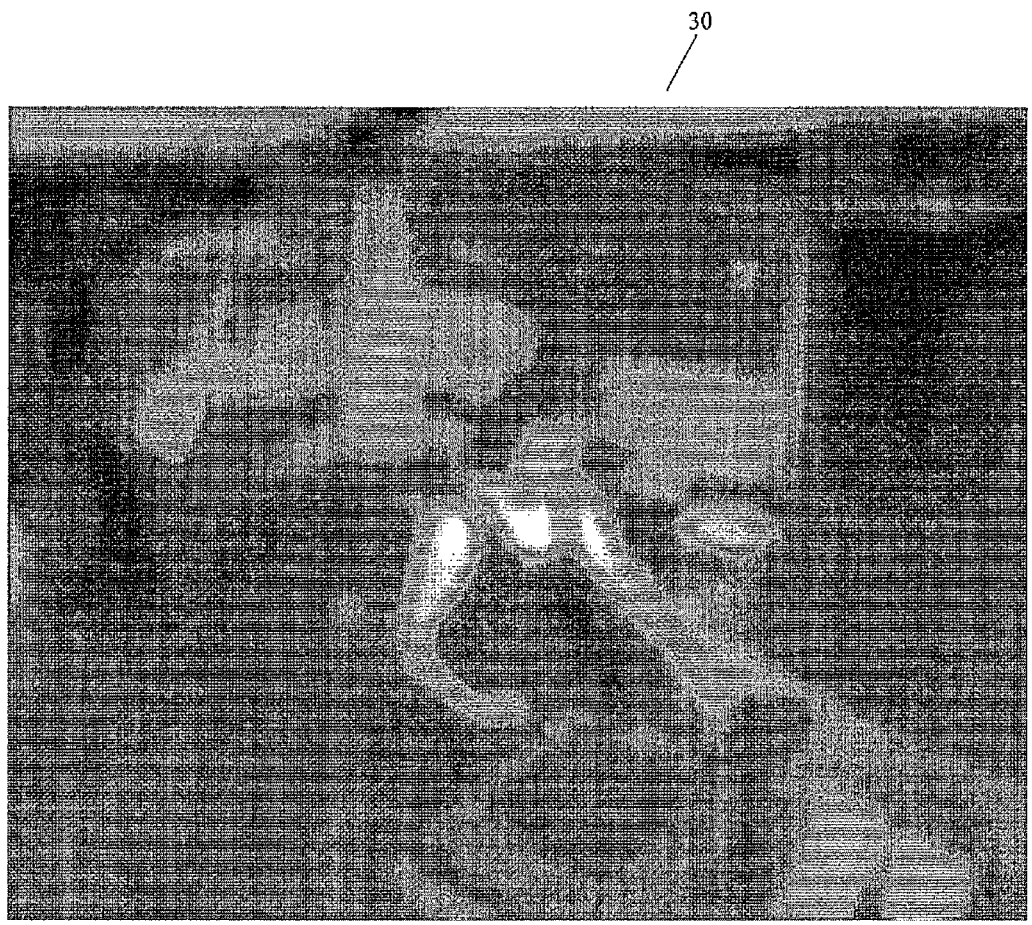
FIG. 2D is the digital image of FIG. 2A after undergoing the structure band-pass mapping of the present invention.

Merely to be exemplary, where the original source image in FIG. 2A is 1024×811 px (pixels), the frequency ranges used to create the structure bandpass mapping of FIG. 2B may be:

upper high-spatial-frequency threshold: 3 px;

lower high-spatial-frequency threshold: 1 px;

and the frequency ranges used to create the detail bandpass mapping of FIG. 2D may be:

upper low-spatial-frequency threshold: 512 px;

lower low-spatial-frequency: 16 px.

(Note: The extremely large blur radius—equal to the width of the image—for the upper frequency range in FIG. 2D may be used to create a particular effect—it allows the image to become "mostly dark" or "mostly light", depending on the brightness of the source image. These are (spatially) global, rather than (spatially) local, value shifts. If smaller values were used, there would be many localized clusters of light and dark throughout the final image rather than fewer. The use of a large value give the entire frame a light or dark bias, much as an artist would, when determining the overall mood or tone of an image).

The higher frequency lowpass map is subtracted from the lower frequency lowpass map to create an image that contains only spatial frequencies between the lower and upper frequency bounds. When this calculation is performed with Gaussian blurred images, the result is known as a Difference of Gaussians (see e.g., Konstantinos G. Derpanis, "Outline of the Relationship Between the Difference-of-Gaussian and Laplacian-of-Gaussian," York University, available at www.cse.yorku.ca/~kosta/CompVis_Notes/Do-Q_vs_LoG.pdf; and Marr, D. and Hildreth, E. (1980), "Theory of edge detection," Proceedings of the Royal Society of London, B-207, 187-217. The Detail Bandpass Map calculation produces negative and positive values that represent the frequency data. The size of the values corresponds to the strength of the frequency information. Zero represents no frequency information. The pseudo code implementation presented here adds a constant value after the subtraction to keep the value range positive.

```
detail_bandpass_map as Picture;
detail_bandpass_map = new Picture(pixel_width, pixel_height);
mid as Real = 0.5; // Pixel values are in the range of 0.0 to 1.0
offset as Real = 0.1; // Example value
gain as Real = 1.5; // Example value
```

```
    i as Integer = 0;
    while (i <  (pixel_width × pixel_height)) // Loop through all pixels
        detail_bandpass_map.Pixel(i) =
        ((lower_high_frequency_detail.Pixel(i)
            − upper_high_frequency_detail.Pixel(i)) × gain) + mid + offset;
        i = i + 1;
    wend
```

FIG. 2B illustrates the results of the detail band pass mapping being performed upon the example input image 15 of FIG. 2A. An optional noise reduction step 25 may be performed for the removal of random image artifacts (noise) within the image, because images that are derived from film or digital cameras can contain undesirable random noise, which is an artifact resulting from image capture hardware, and which is without any meaningful visual information. The "signal to noise ratio" may be improved by the application of an optional noise reduction step. Since the Detail Band-pass Map 20 produces negative and positive values which represent the filtered frequency information and the size of the values correspond to the strength of the frequency information, zero represents no frequency information. So, the Noise Reduction step may identify a range of values that are near zero, and may thereafter set them to zero. In the pseudo code implementation presented here, the previous constant value used to keep the range positive functions as the zero-crossing value and signal values below the threshold are set to this value.

```
    noise_lower_bound as Real = 0.25;
    noise_upper_bound as Real = 0.75;
    i = 0
    while (i <  (pixel_width × pixel_height))
        if (detail_bandpass_map.Pixel(i) > noise_lower_bound and
            detail_bandpass_map.Pixel(i) < noise_upper_bound) then
            // Pixel signal is not strong enough, treat it as noise
            detail_bandpass_map.Pixel(i) = mid;
        end
        i = i + 1;
    wend
```

FIG. 2C illustrates the results of the optional noise reduction being performed upon the example Detail Band-pass Map 20 of FIG. 2B.

The second copy of the input image 15 from the frequency separation step 17—the copy containing the low spatial frequencies that capture the visual structure of the image—may be filtered in the Structure Band-pass Map 30. By excluding high frequency information, this map is temporally stable with regard to changes in high frequency input, such as the motion of small objects in the scene or random noise introduced by image capture methods. The creation of the Structure Band-pass Map is controlled according to two required parameters and two other optional parameters, as follows:

Upper Bound Frequency (required): Frequencies above this ceiling are dropped.
Lower Bound Frequency (required): Frequencies below this floor are dropped.
Gain (optional): This multiplies the final frequency range and controls "detail amplification."
Offset (optional): This adds to/subtracts from the final frequency range and controls "light and shadow bias" (i.e., a bias value is used to globally raise or lower all pixel values, brightening or darkening the image globally, and shifting the ratio of dark to light pixels in the final image).

The implementation presented here performs this calculation in image space. The process of creating the Structure Band-pass Map 30 is comparable to the process of creating the Detail Band-pass Map 20, except that different values for the frequency bounding parameters are used:

```
    lower_low_frequency_blur_radius as Real = 10; // Example value
    upper_low_frequency_blur_radius as Real = 20; // Example value
    lower_low_frequency_detail as Picture;
    lower_low_frequency_detail = Smooth(single_channel_image,
        lower_low_frequency_blur_radius);
    upper_low_frequency_detail as Picture;
    upper_low_frequency_detail = Smooth(single_channel_image,
        upper_low_frequency_blur_radius);
    structure_bandpass_map as Picture;
    structure_bandpass_map = new Picture(pixel_width, pixel_height);
    i = 0;
    while (i <  (pixel_width × pixel_height)) // Loop through all pixels
        structure_bandpass_map.Pixel(i) =
        ((lower_low_frequency_detail.Pixel(i) −
            upper_low_frequency_detail.Pixel(i)) × gain) + mid + offset;
        i = i + 1;
    wend
```

FIG. 2D illustrates the results of the detail band pass mapping being performed upon the example input image 15 of FIG. 2A. A Noise Reduction pass is not necessary with the Structure Band-pass Map 30 because the lower bound frequency used is large enough that it functions as a Noise Reduction filter.

Next, the output from the Detail Band-pass Map 20 and the Structure Band-pass Map 30 are composited together to produce the final image. The composite operation used is subtraction, whereby the Detail Band-pass Map 20 is subtracted from the Structure Band-pass Map 30. In the pseudo code implementation presented, an offset parameter is used to keep the final value range positive.

```
    composite_result as Picture;
    composite_result = new Picture(pixel_width, pixel_height);
    i = 0;
    while (i <  (pixel_width × pixel_height)) // Loop through all pixels
        composite_result.Pixel(i) = (structure_bandpass_map.Pixel(i) *
            0.5) + detail_bandpass_map.Pixel(i);
        i = i + 1;
    wend
```

Figure 2E:
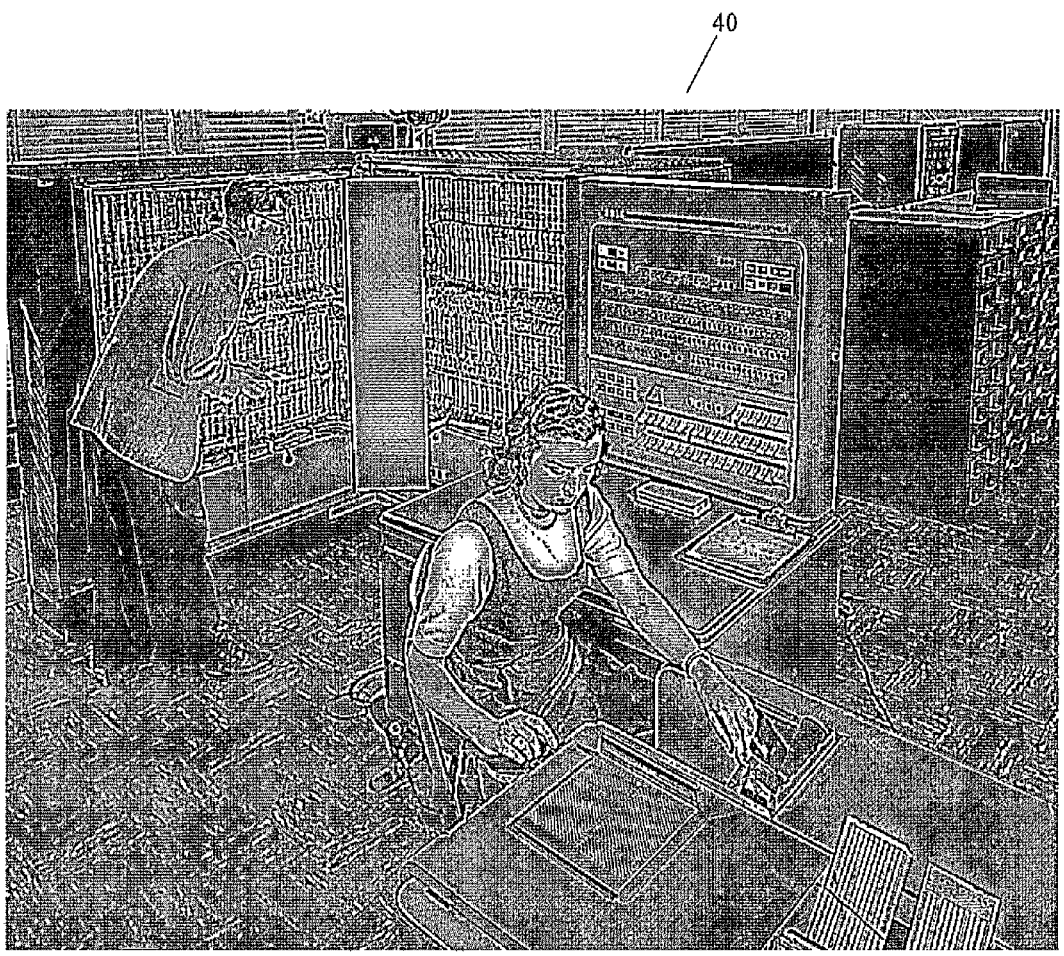
FIG. 2E is the resultant digital image of FIG. 2C and FIG. 2D after undergoing the composite output method of the present invention.

FIG. 2E illustrates the resultant composite image formed by the method of the present invention, through the subtraction of the image of FIG. 2B that resulted from the Detail Band-pass Map 20, from the image of FIG. 2D that resulted from the Structure Band-pass Map 30. Although this represents an image space implementation of the band pass algorithm of the present invention, a corresponding frequency space implementation of the band pass algorithm may also be performed using Fourier operations.

Figure 2F:
FIG. 2F is the resultant digital image of FIG. 2E after undergoing the threshold output method of the present invention.
Figure 2G:
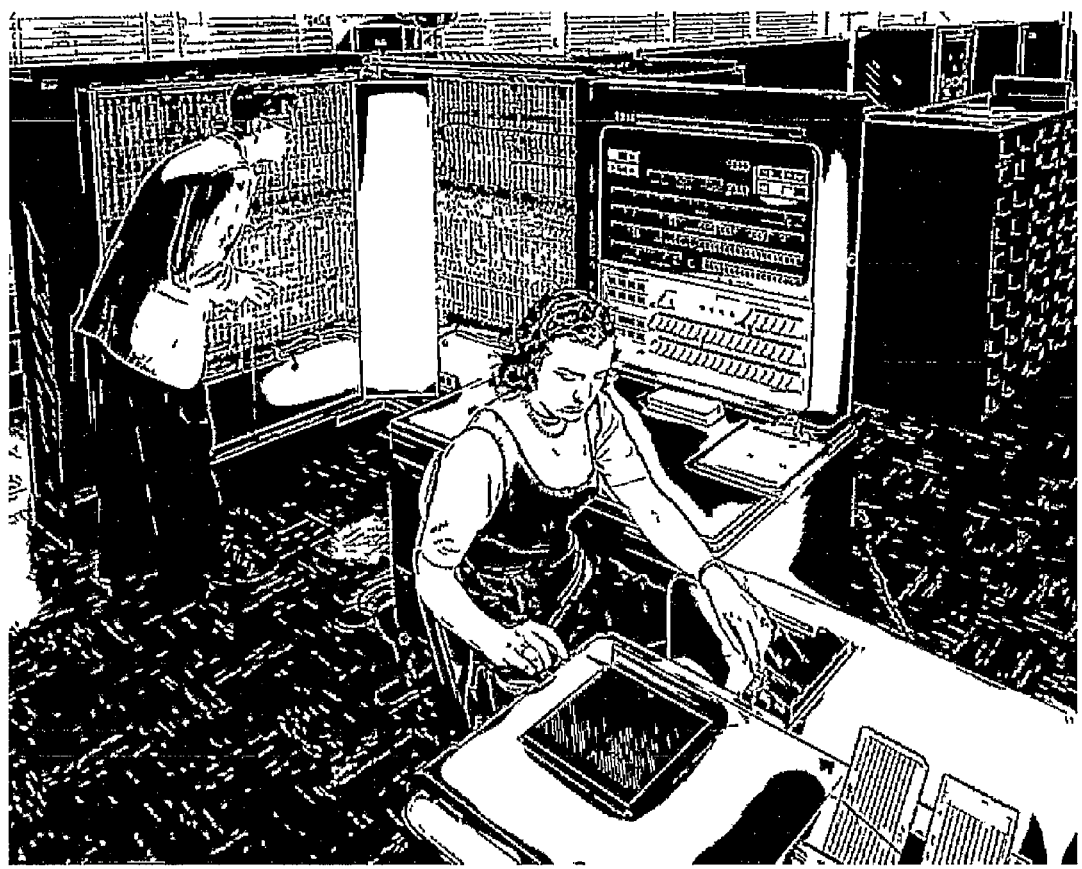
FIG. 2G is the resultant digital image of FIG. 2D after undergoing the optional detail reduction method of the present invention.

An additional step may also be performed, to produce a Threshold Output 45, in which all of the values in the Composite Output 40 are set to either 0 or 1, to create an image with the minimum amount of information possible, where the grayscale image is converted to a black and white image. A threshold value is set as a parameter, and any values below the threshold are converted to black, any values above the threshold are converted to white. This thresholding may be used as both a data compression step, where the image can be represented by a minimum of two values and anything else can be eliminated, and a simplification step. FIG. 2F illustrates the results of the Threshold Output 45 method of the present invention.

An optional Post-Processing step 50 for detail reduction may also be performed, in which the removal of visually insignificant image detail may serve to achieve image simplification. The output image may be simplified by an optional Noise Reduction and Image Simplification step using a "connected component removal" process. In this process, each color value in the composite image output 40 or the threshold output 45 is compared to its neighbor. Values with similar neighbor values are connected to form regions of similar value. The number of values in a region corresponds to the area of the region. Regions with an area below a defined threshold are removed. This threshold value for Post-Processing step 50 is different from the threshold used in step 45. In this case it does not represent a pixel's intensity, but a region or pixel grouping's area. i.e., a group of 6 white pixels has an area of 6 pixels. Area and Pixels have a 1:1 relationship. So if the threshold for groupings that needed to be removed was 10 pixels, then a grouping of 6 pixels would fall below that threshold and would be removed from the image. "Region removal" can be performed by automatic in-filling (i.e., filling in missing data), or if applied to Threshold Output (450), by bit-flipping. In practice, small area values represent noise while larger area values represent image details. Removal of small regions constitutes Noise Reduction. Removal of larger regions constitutes Image Simplification. In general, in-filling may be accomplished by using a weighted average of pixel values of the neighboring pixels.

It should be noted that additional composite steps may also be performed after for Post-Processing step 50, such as a final composite step where the image is composited with color information, depending upon such a need to process and stylize color information.

The compositing of the Detail Band-pass Map 20 and the Structure Band-pass Maps 30 into the Composite Output 40 creates a stylized image that resembles an artistic rendering by emulating the artistic process of distinguishing between low and high spatial frequencies. This type of rendering is an elegant way to encode just the visual information that would be relevant to a viewer. The process has several identifiable visual elements that are considered useful properties of many artistic rendering techniques.

Figure 3B:
FIG. 3B is the source image for FIG. 3A, shown prior to performing of any of the processing step(s) of the current invention.
Figure 3A:
FIG. 3A illustrates an image produced by the method of the present invention, whereby light and dark edges are exaggerated to reveal details of object form, by the placement of high frequency white lines against low frequency areas of black, and by the placement of high frequency black lines against low frequency areas of white.

For example, artists often exaggerate light and dark edges to reveal details of object form. In the case of high contrast imagery (such as comic book illustration, ancient Greek black figure or red figure pottery, and woodblock engraving illustration), high frequency white lines are placed against low frequency areas of black, and high frequency black lines are placed against low frequency areas of white. This is illustrated in FIG. 3, which was produced by using the hereinabove described method.

Figure 4B:
FIG. 4B is the source image for FIG. 4A, shown prior to the performing any of the required processing step(s).
Figure 4A:
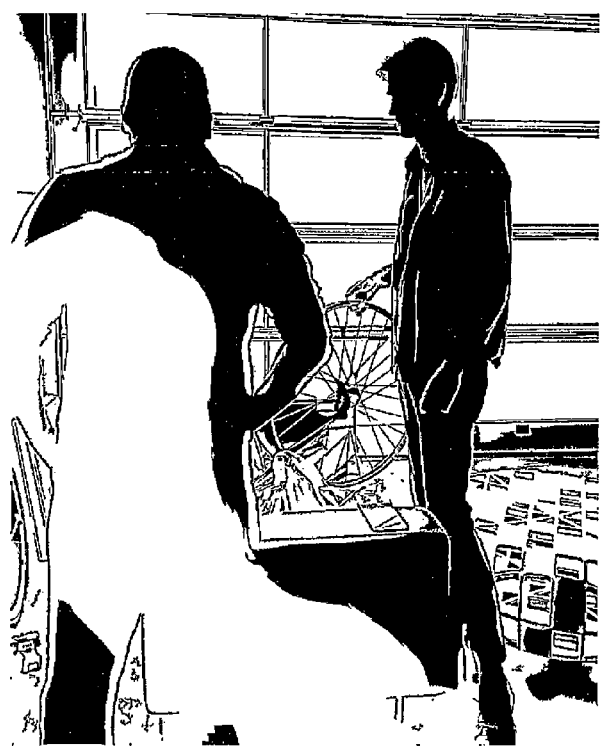
FIG. 4A illustrates an image produced by the method of the present invention, whereby disagreement between boundary edges in the detail band-pass mapping and the structure band-pass mapping creates visual effects, such as exaggerated backlight halos.

Disagreement between boundary edges in the Detail Band-pass Map 20 and Structure Band-pass Map 30 automatically creates visual effects such as exaggerated backlight halos, as seen in FIG. 4.

Figure 5B:
FIG. 5B is the source image for FIG. 5A, shown prior to the performing any of the required processing step(s).
Figure 5A:
FIG. 5A illustrates a desirable graphic artifact that is created when the structure band-pass map is computed in image space using discrete maps, where numerical imprecision in the upper and lower bound blur maps results in stair-stepping of each map's values, creating the appearance of jagged edges from the numerical errors when subtracting one map from the other.

A desirable graphic artifact is created when the Structure Band-pass Map 30 is computed in image space using discrete maps: Numerical imprecision in the upper and lower bound blur maps results in banding (or stair-stepping) of each map's values. Numerical errors when subtracting one map from the other introduce jagged edges that appear to be made by an artist filling in the dark areas with brush and ink, as seen in FIG. 5. Brush and ink illustrators use a technique of filling in large areas of black (such as areas of low frequency detail) with quick brush strokes of ink. The tapered leading and trailing edges of the brush stroke soften hard transitions by introducing a cross-hatch effect.

Figure 6B:
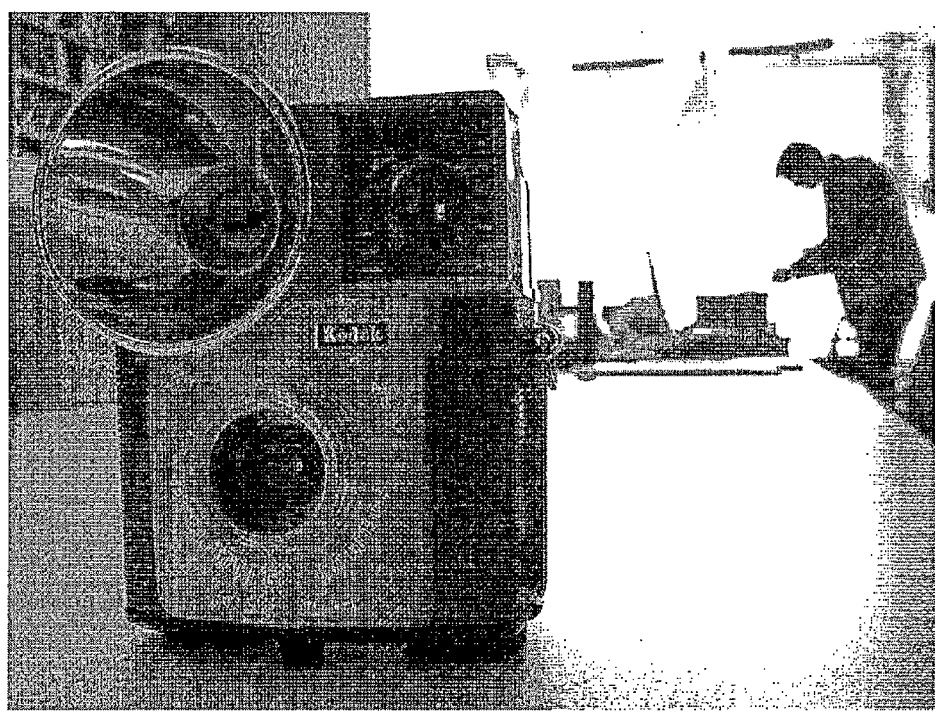
FIG. 6B illustrates the image of FIG. 6A after undergoing the process of the present invention. For out of focus areas of the image where the high frequency band-pass map doesn't contain any information, the low frequency band-pass map will be all that is shown, which replicates a similar technique used in artist's renderings using high contrast media, where blobs of ink are used to indicate a form that is out of focus.
Figure 6A:
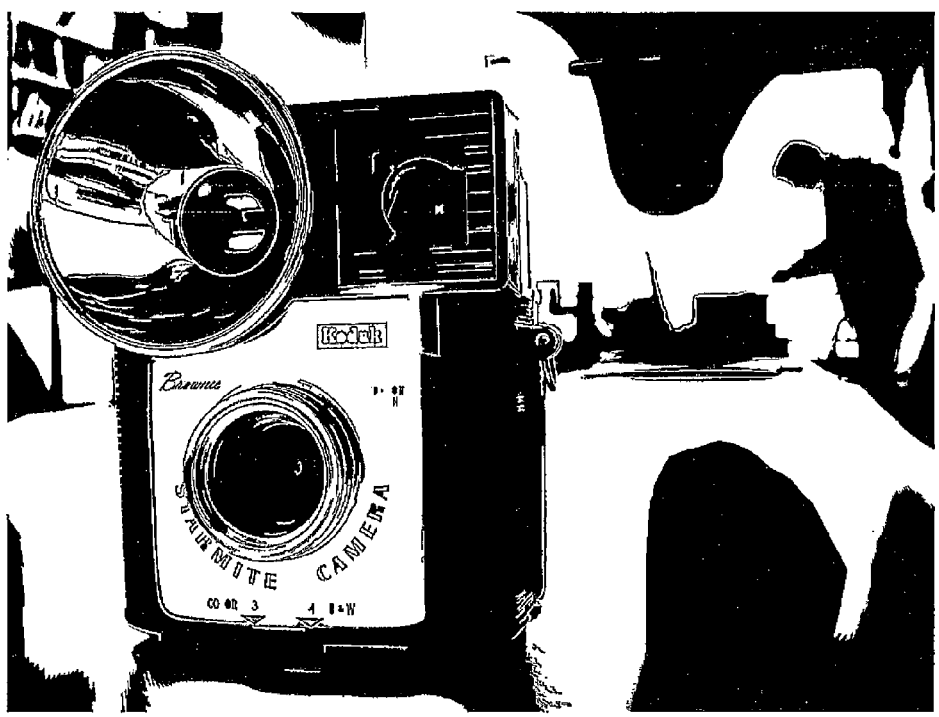
FIG. 6A illustrates an image that is partially in focus and partially out of focus in order to draw the viewer's attention to the parts of the image that are in focus.

If the high frequency band-pass map doesn't contain any information, then the low frequency band-pass map will be all that is shown. A similar technique is used in artist's renderings using high contrast media, such as pen and ink, where blobs of ink are used to indicate form that is out of focus, as seen in comparing FIGS. 6A and 6B.

Figure 7:
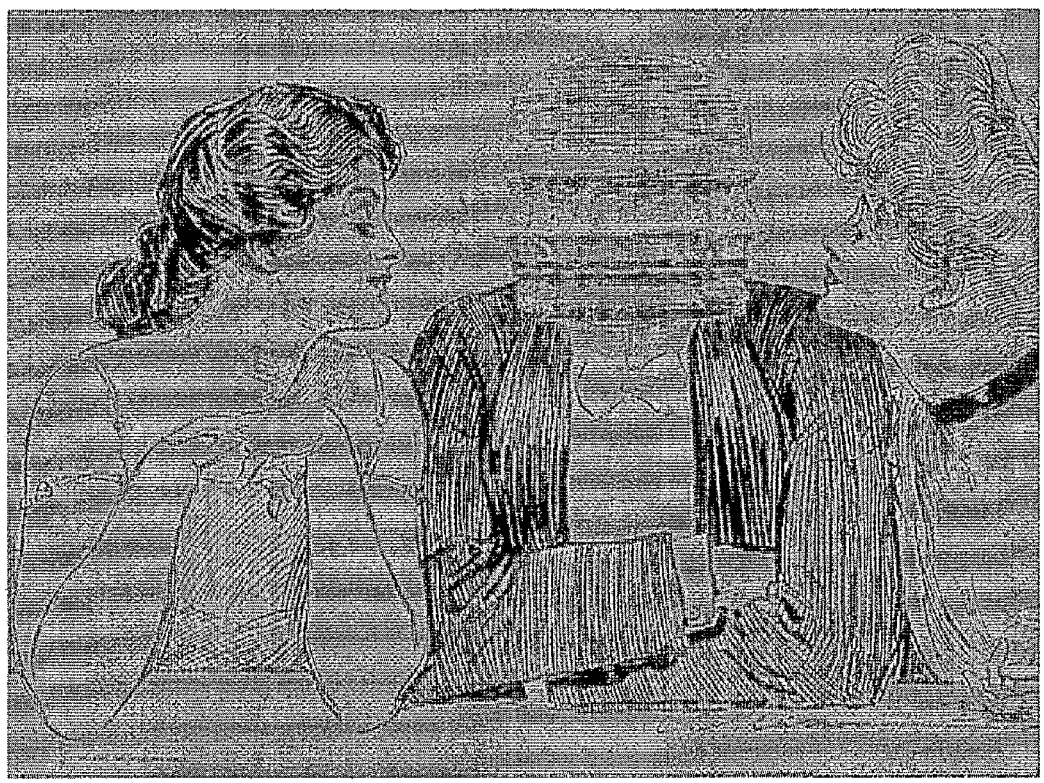
FIG. 7 is an illustration, by the noted illustrator Charles Dana Gibson, which contains motion (directional blurs) to show a "speed line" effect, which may be illustrated by the process of the present invention by the high frequency band-pass map creating edges that align with the direction of motion.

If the source image contains motion (directional) blurs, then the high frequency band-pass map will create edges that align with the direction of motion. This is visually similar to "speed line" effects used by illustrators and animators, as shown by the illustration in FIG. 7, by the noted illustrator Charles Dana Gibson.

Figure 8B:
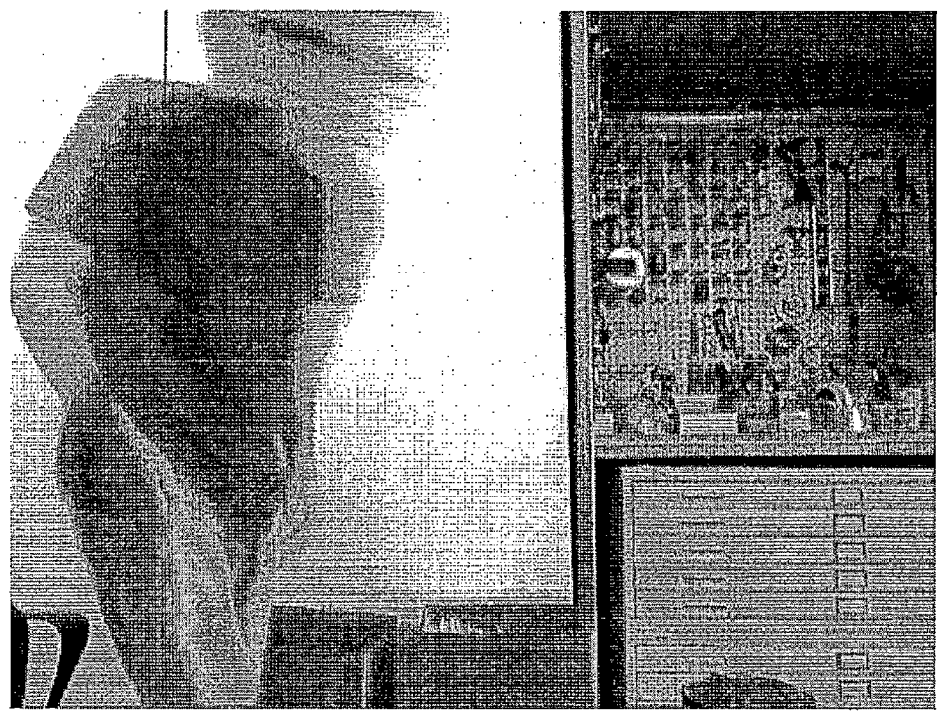
FIG. 8B is the source image for FIG. 8A, shown prior to the performing any of the required processing step(s).
Figure 8A:
FIG. 8A shows an image that illustrates the results of applying the method of the present invention to an image of a scene, which contains motion blurs.

FIG. 8A shows the result of applying the method described herein to an image of a static scene, taken when the camera was held steady. FIG. 8B shows the result of applying the method to an image of the same scene where the camera was moved during the exposure, resulting in motion blur.

The separation of images into structure and detail components is an economical way to encode images. The Detail Band-pass Map 20, the Structure Band-pass Map 30, the Composite Output 40, or Threshold Output 45 may produce sparse visual representations that work well with digital image compression algorithms.

Separation of the image into structure and detail components provides temporal stability in the structure component. When processing video frames or a sequence of still images that change over time, the lower bound frequency cutoff of the Structure Band-pass Map 30 removes high frequency information. In normal image or frame sequences of people, environments or nature captured from the real world by cameras, high frequency visual information changes more rapidly than low frequency visual information. The Structure Band-pass Map 30 component provides spatial continuity over time, which has two effects:

a. Less visual distraction: "Jumping" and "Jittering" of irrelevant visual information is filtered out; and b. Better video compression: Digital video compression algorithms produce more efficient encoding because these compression algorithms look for, and encode, temporally stable visual information.

Figure 9:
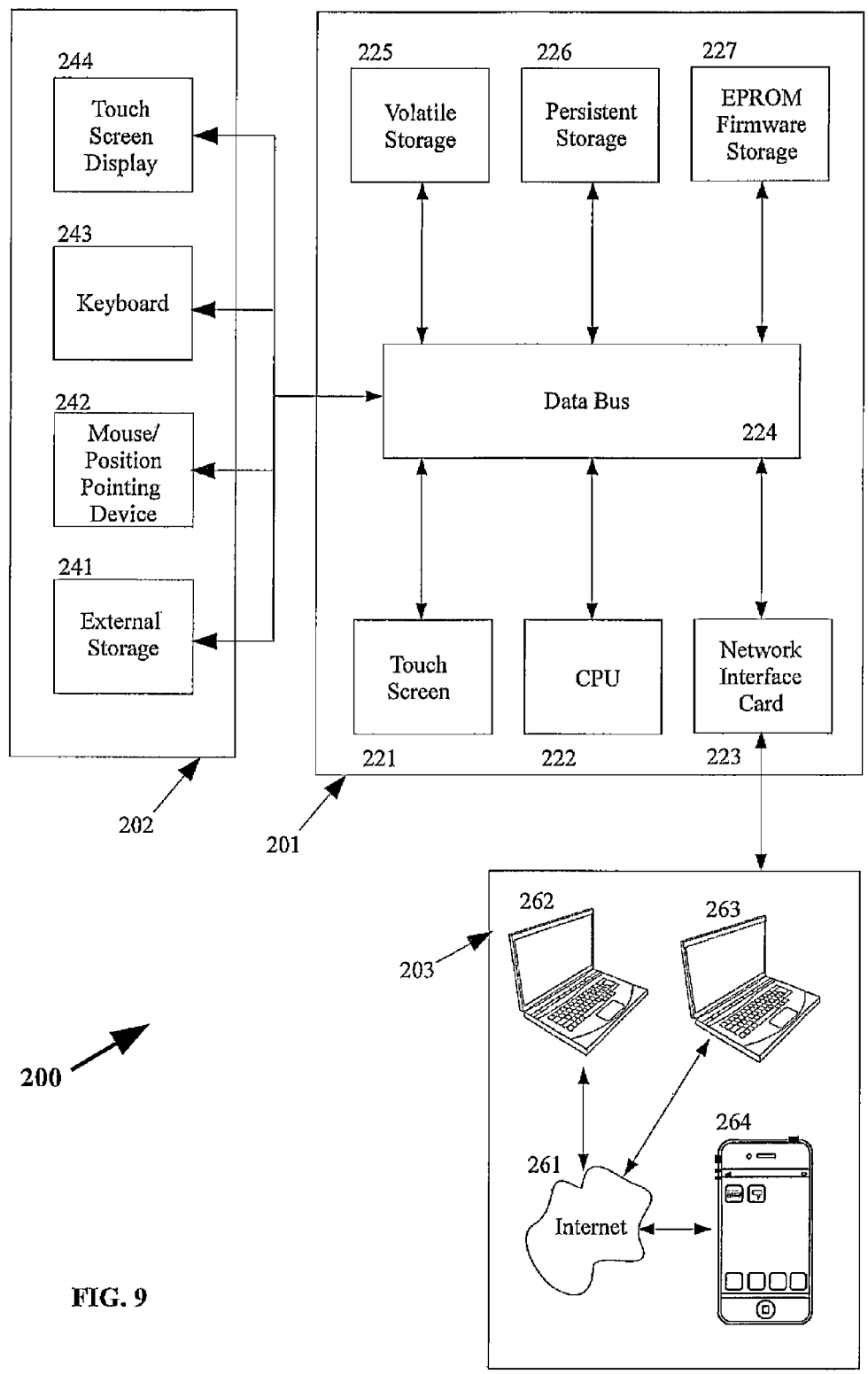
FIG. 9 is a schematic showing an exemplary computing unit capable of being programmed by the instructions of the software of the present invention, and which may include cellular phones, personal computers, and other smart devices.

Software of the present invention may run on a computer, a server, a tablet, a cell phone, or other smart device, so a description of such an accessorized exemplary computer system is hereinafter disclosed, even though a particular embodiment may not require all of the described components. Exemplary computer system 200 is shown schematically in FIG. 9, and which may comprise computing unit 201 interacting with external peripherals 202, such as a separate touch screen display 244, and interacting with network resources 203, including use of the internet 261, and other computers, which may be first and second laptop computers 262/263, a tablet, a smart phone, etc.

The computing unit 201 may include a data bus 224 for communicating information across and among various parts of computing unit 201, and a central processing unit, which may be a microprocessor (hereinafter "processor" or "CPU") 222 coupled with a bus 224 for processing information and performing other computational and control tasks. Computing unit 201 may also include a volatile storage 225, such as a random access memory (RAM) or other dynamic storage device, coupled to bus 224 for storing various information as well as instructions to be executed by processor 222. The volatile storage 225 may also be used for storing temporary variables or other intermediate information during execution of instructions by processor 222. Computing unit 201 may further include a read only memory (ROM) or an erasable programmable memory (EPROM) 227 or other static storage device coupled to bus 224 for storing static information and instructions for processor 222, such as basic input-output system (BIOS), as well as various system configuration parameters. A persistent storage device or non-volatile memory 226, such as a magnetic disk, optical disk, or solid-state flash memory device may be provided and may be coupled to bus 224 for storing information and instructions.

Computing unit 201 may be coupled via bus 224 to an integral display 221, possibly a touch-screen display, for use in displaying information to a user. If desired, computing unit 201 may be coupled via bus 224 to an external display screen 244. An external input device 243 (e.g., a standard keyboard) may be coupled to bus 224 for communicating information and command selections to processor 222. A cursor control device 242, such as a mouse, a trackball, or cursor direction keys, may be used for communicating direction information and command selections to processor 222 and for controlling cursor movement on display 244. An external storage device 241 may be connected to the computing unit 201 via bus 224 to provide an extra or removable storage capacity for the computing unit 201, which may be used to facilitate exchange of data with other computer systems.

Some of the techniques herein may be performed by computing unit 201 in response to processor 222 executing one or more sequences of one or more instructions contained in the volatile memory 225. Execution of the sequences of instructions contained in a non-transitory memory may cause processor 222 to perform the process steps described herein. In alternative embodiments, specific hard-wired digital circuitry may be used in place of, or in combination with, software instructions to implement the invention.

The term "computer-readable medium" as used herein refers to any medium that participates in providing instructions to processor 222 for execution. The computer-readable medium is just one example of a machine-readable medium, which may carry instructions for implementing any of the methods and/or techniques described herein. Various forms of computer readable media may contain one or more sequences of one or more instructions for the processor 222 to execute, including non-volatile media (storage device 226), and volatile media (storage device 225). Common forms of computer-readable media include, for example, a floppy disk, a hard disk, magnetic tape, or any other magnetic medium, a CD-ROM, a flash drive, and a memory card.

The computing unit 201 may thus also include a communication interface, such as network interface card 223 coupled to the data bus 222. Communication interface 223 may provide a two-way data communication coupling to a network link that may be connected to a local network. For example, communication interface 223 may be an integrated services digital network (ISDN) card or a modem to provide a data communication connection to a corresponding type of telephone line, or it may be a local area network interface card (LAN NIC) to provide a data communication connection to a compatible LAN.

Network link 223 also typically provides data communication to other network resources. For example, the network link may provide a connection over the internet 261 to the world-wide-web. Thus, the computing unit 201 can access resources located anywhere using the Internet 261. Also, the computing unit 201 may also be accessed by, or communicate with, other computers (e.g. 262-263), or another smart device (e.g., smartphone 264), generally with permission, and which may be located anywhere with access to the internet 261.

The examples and descriptions provided merely illustrate a preferred embodiment of the present invention. Those skilled in the art and having the benefit of the present disclosure will appreciate that further embodiments may be implemented with various changes within the scope of the present invention. Other modifications, substitutions, omissions and changes may be made to the preferred embodiment without departing from the spirit of this invention.

I claim:

1. A computer program product, for use in a method of manipulating the spatial frequencies of an image, said computer program product comprising a non-transitory computer-readable storage medium storing instructions that, when executed on a processor, cause the processor to manipulate the image according to said method, said method comprising:
    inputting the image;
    converting the image into a single-channel grayscale image;
    separating the grayscale image into a first component image comprising high spatial frequencies, and a second component image comprising low spatial frequencies;
    filtering said first component image for filtering out frequencies above an upper high-spatial-frequency threshold, and for filtering out frequencies below a lower high-spatial-frequency threshold;
    blurring said filtered first component image at each of said upper high-spatial-frequency threshold and said lower high-spatial-frequency threshold;
    filtering said second component image for filtering out frequencies above an upper low-spatial-frequency threshold, and for filtering out frequencies below a lower low-spatial-frequency threshold; and
    producing a composite image by subtracting the filtered and blurred first component image from the filtered second component image.

2. The computer program product according to claim 1, wherein said method further comprises using an offset parameter for keeping a value range of said composited image positive.

3. The computer program product according to claim 1, wherein said blurring comprises a blurring technique from the group of blurring techniques consisting of: a Gaussian blur, a Box blur, and a blur filter.

4. The computer program product according to claim 1, wherein said method farther comprises said filtered first component image being offset to control light and shadow bias.

5. The computer program product according to claim 1, wherein said method further comprises performing a noise reduction step for removing random image artifacts from said separated first component image.

6. The computer program product according to claim 1, wherein said method further comprises setting all of the values in the composite image to either 0 or 1, for converting the composited grayscale image to a black and white image, by setting a threshold value, and by converting any values in the composted image below the threshold to black, and converting any values in the composted image above the threshold to white.

7. The computer program product according to claim 6, wherein said method further comprises simplifying said black and white image in a component removal process by comparing a value in the black and white image to its neighbor value; wherein a value with two or more similar neighbor values are connected to form regions of similar value; and wherein a region with an area below a defined threshold is removed.

8. The computer program product according to claim 1, wherein said method further comprises applying a gain multiplier to said filtered first component image and to said filtered second component image to control detail amplification.

9. A processor-implemented method, for manipulating the spatial frequencies of an image, said method comprising the following steps implemented by one or more processors:
  inputting the image;
  converting the image into a single-channel grayscale image;
  separating the grayscale image into a first component image comprising high spatial frequencies, and a second component image comprising low spatial frequencies, said separating comprising:
    filtering the grayscale image for filtering out frequencies above an upper high-spatial-frequency threshold and for filtering out frequencies below a lower high-spatial-frequency threshold, to produce said first component image;
    filtering the grayscale image for filtering out frequencies above an upper low-spatial-frequency threshold and for filtering out frequencies below a lower low-spatial-frequency threshold, to produce said second component image;
  blurring said first component image at each of said upper high-spatial-frequency threshold and said lower high-spatial-frequency threshold; and
  producing a composite image by subtracting the blurred first component image from the second component image.

10. The processor-implemented method according to claim 9, wherein said method further comprises using an offset parameter for keeping a value range of said composited image positive.

11. The processor-implemented method according to claim 9, wherein said blurring comprises a blurring technique from the group of blurring techniques consisting of a Gaussian blur, a Box blur, and a blur filter.

12. The processor-implemented method according to claim 9, wherein said method further comprises said filtered first component image being offset to control light and shadow bias.

13. The processor-implemented method according to claim 9, wherein said method further comprises performing a noise reduction step for removing random image artifacts from said separated first component image.

14. The processor-implemented method according to claim 9, wherein said method further comprises setting all of the values in the composite image to either 0 or 1, for converting the composited grayscale image to a black and white image, by setting a threshold value, and converting any values in the composted image below the threshold to black, and converting any values in the composted image above the threshold to white.

15. The processor-implemented method according to claim 14, wherein said method further comprises simplifying said black and white image in a component removal process by comparing a value in the black and white image to its neighbor value; wherein a value with two or more similar neighbor values are connected to form regions of similar value; and wherein a region with an area below a defined threshold is removed.

16. The processor-implemented method according to claim 9, wherein said method further comprises applying a gain multiplier to said filtered first component image and to said filtered second component image to control detail amplification.

* * * * *